United States Patent
Kim et al.

(10) Patent No.: US 10,816,851 B2
(45) Date of Patent: Oct. 27, 2020

(54) THIN INFORMATION HANDLING SYSTEM DISPLAY LIGHT GUIDE PLATE SPACING

(71) Applicant: Dell Products L.P., Round Rock, TX (US)

(72) Inventors: Jeongki Kim, Singapore (SG); Seen Yee Cindy Cheong, Singapore (SG); Bongjun Lee, Singapore (SG); Kyung Eun Lee, Singapore (SG); Hyunseok Ko, Seochogu (KR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/262,039

(22) Filed: Jan. 30, 2019

(65) Prior Publication Data
US 2020/0241359 A1 Jul. 30, 2020

(51) Int. Cl.
| | |
|---|---|
| *G09G 3/36* | (2006.01) |
| *G02F 1/13357* | (2006.01) |
| *G02F 1/1335* | (2006.01) |
| *G02F 1/1333* | (2006.01) |
| *F21V 8/00* | (2006.01) |
| *G09G 3/3233* | (2016.01) |

(52) U.S. Cl.
CPC ..... *G02F 1/133603* (2013.01); *G02B 6/0073* (2013.01); *G02F 1/133308* (2013.01); *G02F 1/133509* (2013.01); *G09G 3/3233* (2013.01); *G09G 3/3637* (2013.01)

(58) Field of Classification Search
CPC ...... G09G 3/30; G09G 3/3233; G09G 3/3256; G09G 3/36; G09G 3/3637
See application file for complete search history.

(56) References Cited

U.S. PATENT DOCUMENTS

| | | | |
|---|---|---|---|
| 5,053,765 A | 10/1991 | Sonehara et al. | |
| 6,388,722 B1 | 5/2002 | Yoshii et al. | |
| 6,642,913 B1 | 11/2003 | Kimura et al. | |
| 8,780,015 B2 | 7/2014 | Watanabe | |
| 9,239,496 B2* | 1/2016 | Ge | G02F 1/13394 |
| 9,645,305 B2* | 5/2017 | Seo | G02B 6/0088 |
| 2014/0307207 A1* | 10/2014 | Ge | G02F 1/13394 |
| | | | 349/106 |
| 2015/0219821 A1* | 8/2015 | Seo | G02B 6/0088 |
| | | | 362/608 |
| 2019/0162993 A1* | 5/2019 | Hong | G02F 1/1339 |

FOREIGN PATENT DOCUMENTS

| | | |
|---|---|---|
| JP | 5259728 B2 | 8/2013 |
| JP | 5459150 B2 | 4/2014 |

* cited by examiner

*Primary Examiner* — Vijay Shankar
(74) *Attorney, Agent, or Firm* — Zagorin Cave LLP; Robert W. Holland

(57) ABSTRACT

An information handling system peripheral display provides backlight to a liquid crystal display panel through a light guide plate with illumination from a light emitting diode package having plural evenly spaced light emitting diodes disposed in a spaced relationship along one side of the light guide plate. For insert molded coupling devices, a midframe structure integrates spacers at opposing ends of the bottom side of the light guide plate to maintain the spaced relationship without any additional intervening structures between the light emitting diode package and light guide plate along the bottom side between the opposing ends.

20 Claims, 6 Drawing Sheets

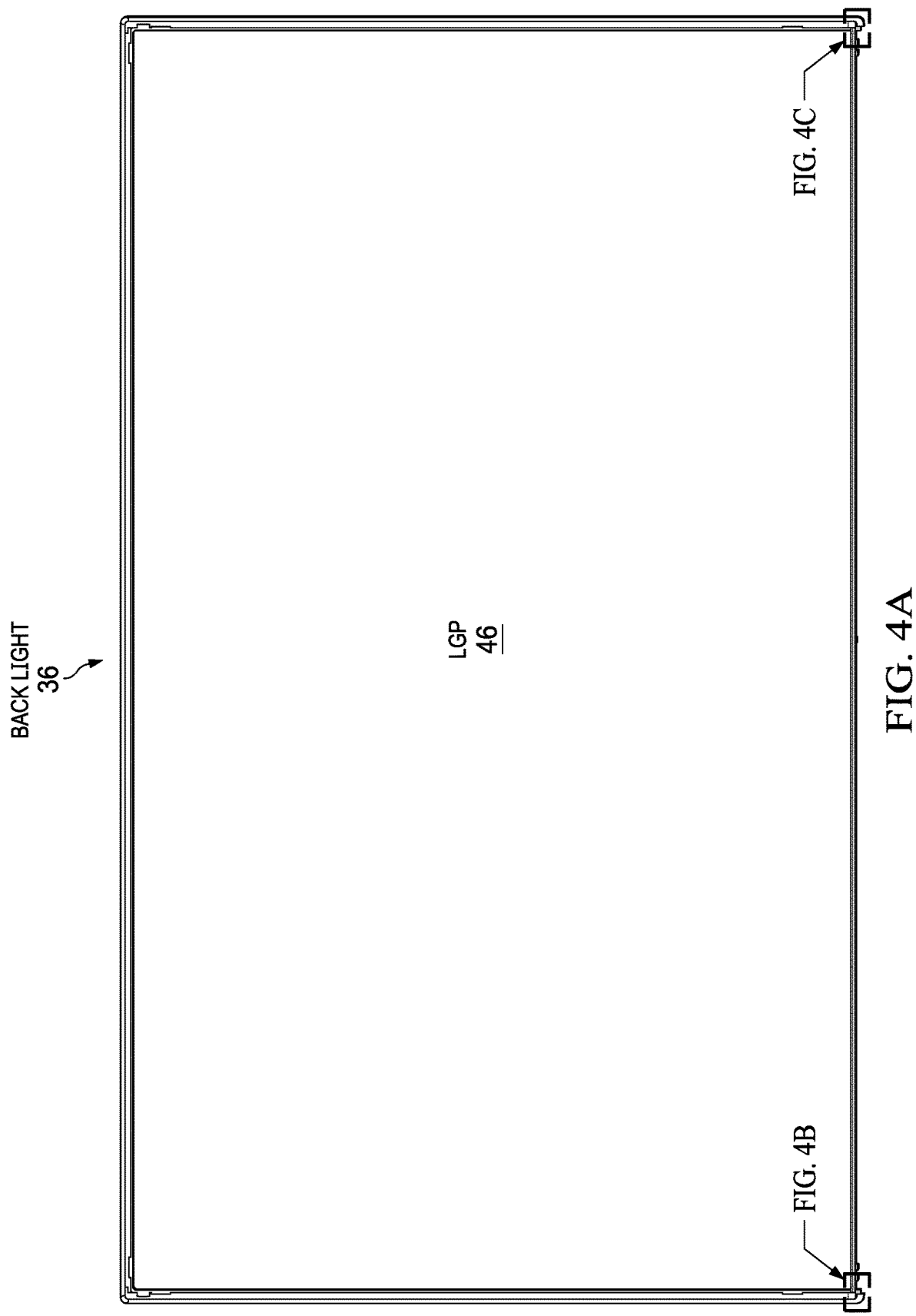

THIN INFORMATION HANDLING SYSTEM DISPLAY LIGHT GUIDE PLATE SPACING

BACKGROUND OF THE INVENTION

Field of the Invention

The present invention relates in general to the field of information handling system displays, and more particularly to a thin information handling system display light guide plate spacing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally present outputs as visual images at a display device, such as a liquid crystal display (LCD). Typical display devices receive visual images from information handling systems as pixel values that define colors of pixels of the display so that cumulatively the pixels present the visual image. Pixel values are typically generated by a graphics processor unit (GPU) to match the pixel resolution of the display and then scanned across the display by a timing controller. Desktop information handling systems typically communicate pixel values to a peripheral display with a display cable, such as a DisplayPort cable. Portable information handling systems typically integrate a display in a portable housing, but also typically support cabled interfaces with peripheral display devices. Generally, peripheral displays offer a larger display surface than a portable information handling system display so that end user interactions are simplified in a desktop environment.

Peripheral displays typically used in desktop environments tend to have a larger display surface and a more bulky chassis. Conventional peripheral displays package display elements in multiple separate housing portions that assemble to contain the display panel, backlight and electronics under a back cover. To achieve a thinner display housing with a narrow bezel around the display surface, an integrated mid-frame structure is injection molded with insert molded coupling devices so that the electronic chassis couples to the same structure as the backlight and display panel for assembly completed by a back cover. One difficulty with this approach is that a light source has to align with the backlight in the mid-frame structure to provide illumination that is directed against the display panel. For instance, a light emitting diode (LED) package generally has plural light emitting diodes disposed in a linear configuration along one side of the backlight to provide illumination that is managed by the backlight. Typically the backlight includes a light guide structure that distributes light across the display panel surface, a reflector that re-directs errant light towards the display panel to aid in efficient illumination use, and prism and diffuser that smooth light for an even distribution at the display panel. The light guide structure is typically a flat plate of material that transmits light, such as glass and plastics like PMMA or MS, with a dot pattern formed along the plate to aid in an even distribution of the light. Generally, the more uniform of illumination provided from a light source, the less manipulation needed in the light distribution pattern of the light guide plate to accomplish a uniform backlight illumination at the display panel.

One difficult with using a single mid-frame structure that holds the display panel, backlight and system electronics chassis is achieving proper alignment of a light emitting diode package along a side of the light guide plate. Irregular spacing of individual light emitting diodes relative to the light guide plate impacts how well light transmits into the light guide plate so that illumination hot spots can form where illumination is more concentrated due to closer proximity of a light element. One solution to help keep an even spacing between individual light emitting diode elements along package and the light guide plate is to add structures between the individual light emitting diode elements that hold a regular spacing. The structures however change the pitch between individual light emitting diode elements and also interfere with light transmission into the light guide plate at the intersection of light emitting diodes having spacing structure between them. Some of the uneven illumination may be corrected by adjusting light guide plate distribution patterns, however, such adjustments are time intensive and imprecise. The result is a more costly peripheral display with a lower quality illumination at the display panel image. Providing a more uniform light source helps to reduce such corrections, improve illumination patterns and reduce device cost.

SUMMARY OF THE INVENTION

Therefore, a need has arisen for a system and method which holds light emitting diodes with a consistent spacing along a side of a light guide plate using a minimalist structure.

In accordance with the present invention, a system and method are provided which substantially reduce the disadvantages and problems associated with previous methods and systems for holding light emitting diodes with consistent spacing along a side of a light guide plate. A mid-frame structure holds a backlight aligned to illuminate a liquid crystal display panel with integrated spacers that support a light emitting diode package in a spaced relationship proximate a light guide plate of the backlight.

More specifically, an information handling system peripheral display presents visual images defined by pixel values applied at liquid crystal pixels of a liquid crystal display panel. A backlight couples in alignment with the liquid crystal display panel to illuminate the liquid crystal pixels in a uniform manner. A mid-frame structure holds the backlight and liquid crystal display panel in alignment, such as with insert molded coupling devices included in an injection molded piece. The backlight directs uniform illumination across the rear surface of the liquid crystal display panel by providing illumination into a light guide plate from a light emitting diode package having plural light emitting diodes. Spacers integrated in the mid-frame structure at opposing ends of the light guide plate define a uniform gap between the light emitting diodes and the light guide plate bottom side across the length of the light emitting diode package without intervening structures that might interfere with light transmission from the light emitting diodes into the light guide plate. For instance, an elongated member couples to the mid-frame structure at the spacers on opposing sides of the light guide plate to hold the light emitting diode package in position without an intervening structure between the light emitting diodes and the light guide structure that might interfere with light transmission.

The present invention provides a number of important technical advantages. One example of an important technical advantage is that a thin peripheral display structure has uniform light transmitted across a liquid crystal display panel by setting uniform spacing between a light source and a light guide plate that distributes illumination to the liquid crystal display panel. Integrating spacers to manage illumination spacing in a mid-frame structure that holds a backlight in alignment with a liquid crystal display panel creates a thin overall display structure with a uniform light source into a light guide plate structure so that fewer corrective measures address illumination non-uniformity. By holding a light emitting diode package with evenly spaced light emitting diodes at a fixed spacing gap to a light guide plate without an intervening structure along the length of the light emitting diode path, a uniform light source is created in a thin housing structure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4A-C depicts a front view of the peripheral display light guide plate having a light emitting diode package held in a spaced relationship.

DETAILED DESCRIPTION

An information handling system peripheral display provides backlight to a liquid crystal display panel with evenly spaced light emitting diodes held in a spaced relationship to a light guide plate with spacers integrated in a midframe structure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
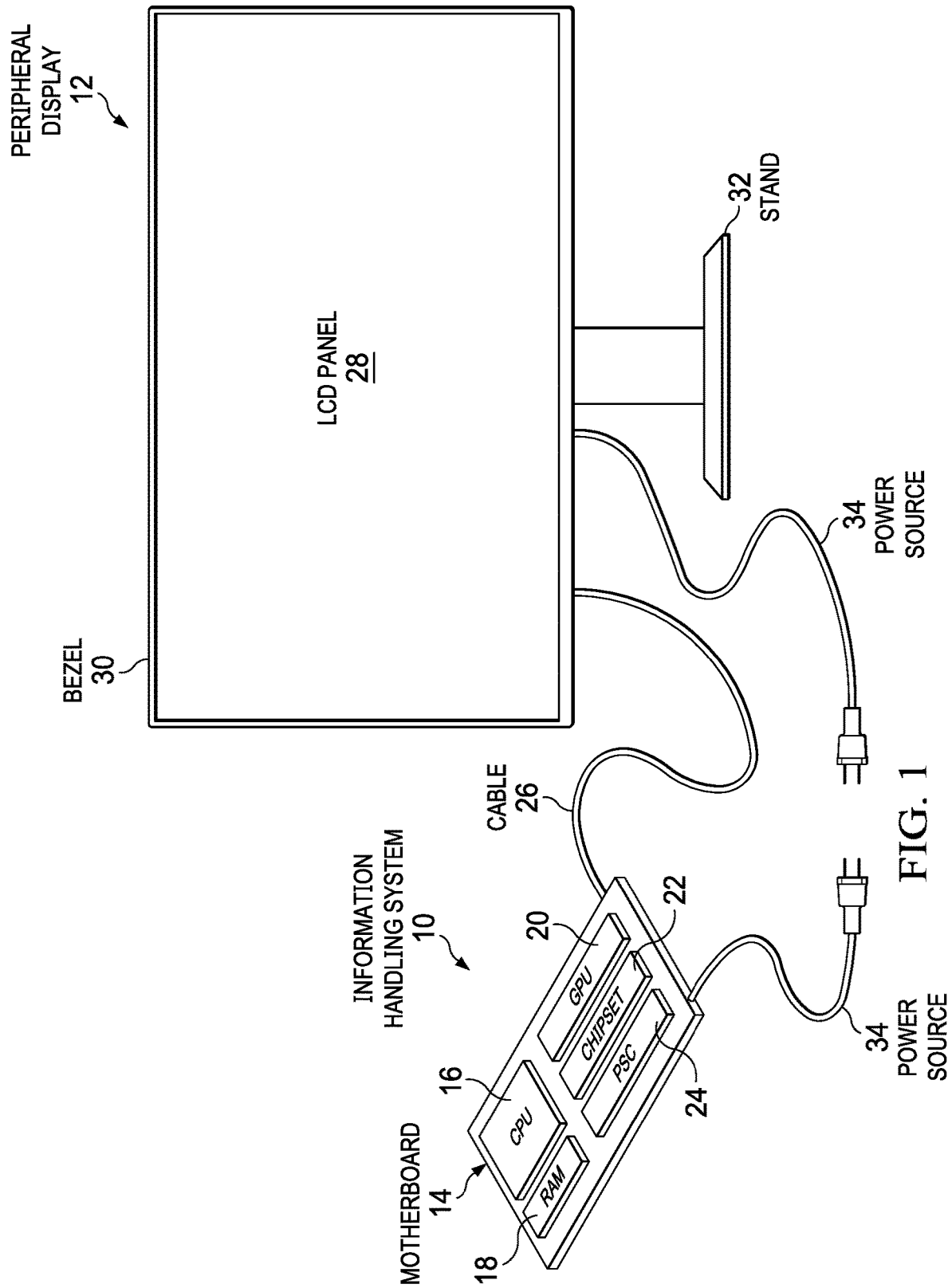
FIG. 1 depicts a peripheral display that presents visual images generated by an information handling system.

Referring now to FIG. 1, a peripheral display 12 presents visual images generated by an information handling system 10. Information handling system 10 generates information with processing components disposed on a motherboard 14 that cooperate to process information. For instance, a central processing unit (CPU) 16 executes instructions of an operating system or application stored in random access memory (RAM) 18 to process information that defines visual images. A graphics processing unit (GPU) interfaces with CPU 16, such as under management of a chipset 22, to further process the visual information into pixel values that define colors of pixels at a display to create the visual images. The pixel values are communicated through a cable 26, such as with the DisplayPort protocol, to peripheral display 12 where a liquid crystal display (LCD) panel having plural pixels applies the pixel values to generate the visual image. Peripheral display 12 captures LCD panel 28 in a stand 32 with a bezel 30 coupled around the outer perimeter of LCD panel 28. In the example embodiment, both information handling system 10 and peripheral display 12 have desktop configurations that run on external power supplies 24 coupled to external power sources, such as an AC wall socket. The example embodiment depicts a desktop environment to illustrate presentation of visual images by an information handling system, although alternative embodiments may include a variety of portable configurations. Further, visual images may be generated by a variety of different types of information handling systems in addition to desktop system, such as portable systems, gaming systems and multimedia devices.

Figure 2:
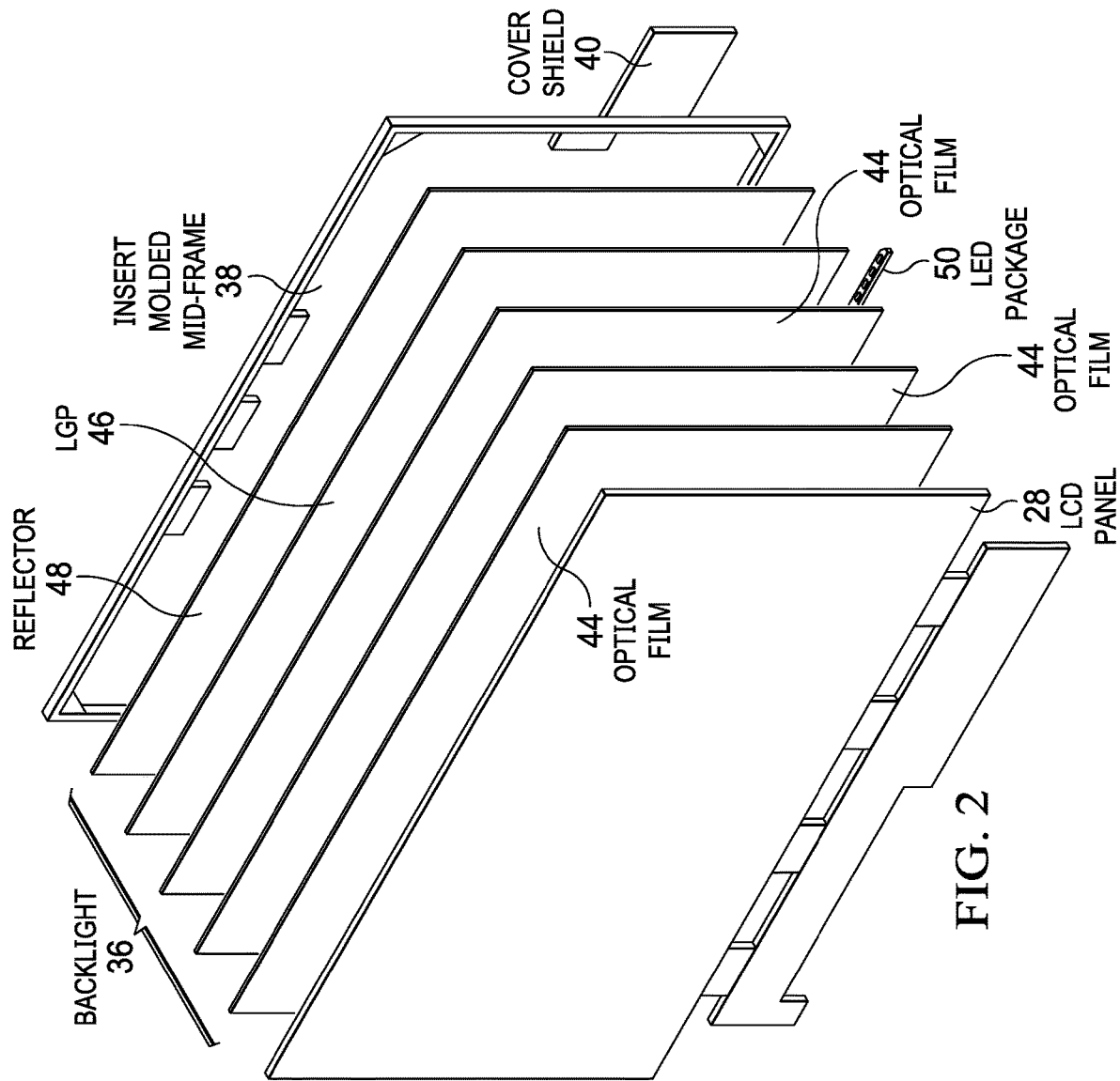
FIG. 2 depicts a front perspective exploded view of the peripheral display.

Referring now to FIG. 2, a front perspective exploded view depicts the peripheral display 12. LCD panel 28 includes plural pixels of liquid crystals that are driven with current to alter their crystal state, thereby changing the amount of light that passes through of various colors. Cumulatively, the pixels define a visual image for presentation based upon pixel values provided from a graphics controller. A backlight 36 provides a uniform illumination behind LCD panel 28 so that the visual image presented by passage of illumination through LCD panel 28 has a uniform appearance. Back light 36 includes plural layers of optical films and plates coupled together by a mid-frame structure 38 and cover shield 40. In the example embodiment, optical films 44 that act as a prism and diffuser smooth the quality of the backlight. A light guide plate (LGP) 46 is disposed behind LCD panel 28 to accept illumination from a light source and distribute the light evenly across LCD panel 28. Optical films 44 disposed between light guide plate 46 and LCD panel 28 soften and smooth the light for a more even illumination of visual images defined by the liquid crystal pixels of LCD panel 28. A reflector plate 48 is disposed on the opposite side of light guide plate 46 to reflect light proceeding away from LCD panel 28 back towards LCD panel 28. A light emitting diode (LED) package 50 is disposed at the bottom side of light guide plate 46 to provide illumination into light guide plate 46, as described in greater depth below. Mid-frame structure 48 is an injection molded plastic piece with insert molded coupling devices that hold the backlight 36 and LCD panel 28 in alignment.

Figure 3:
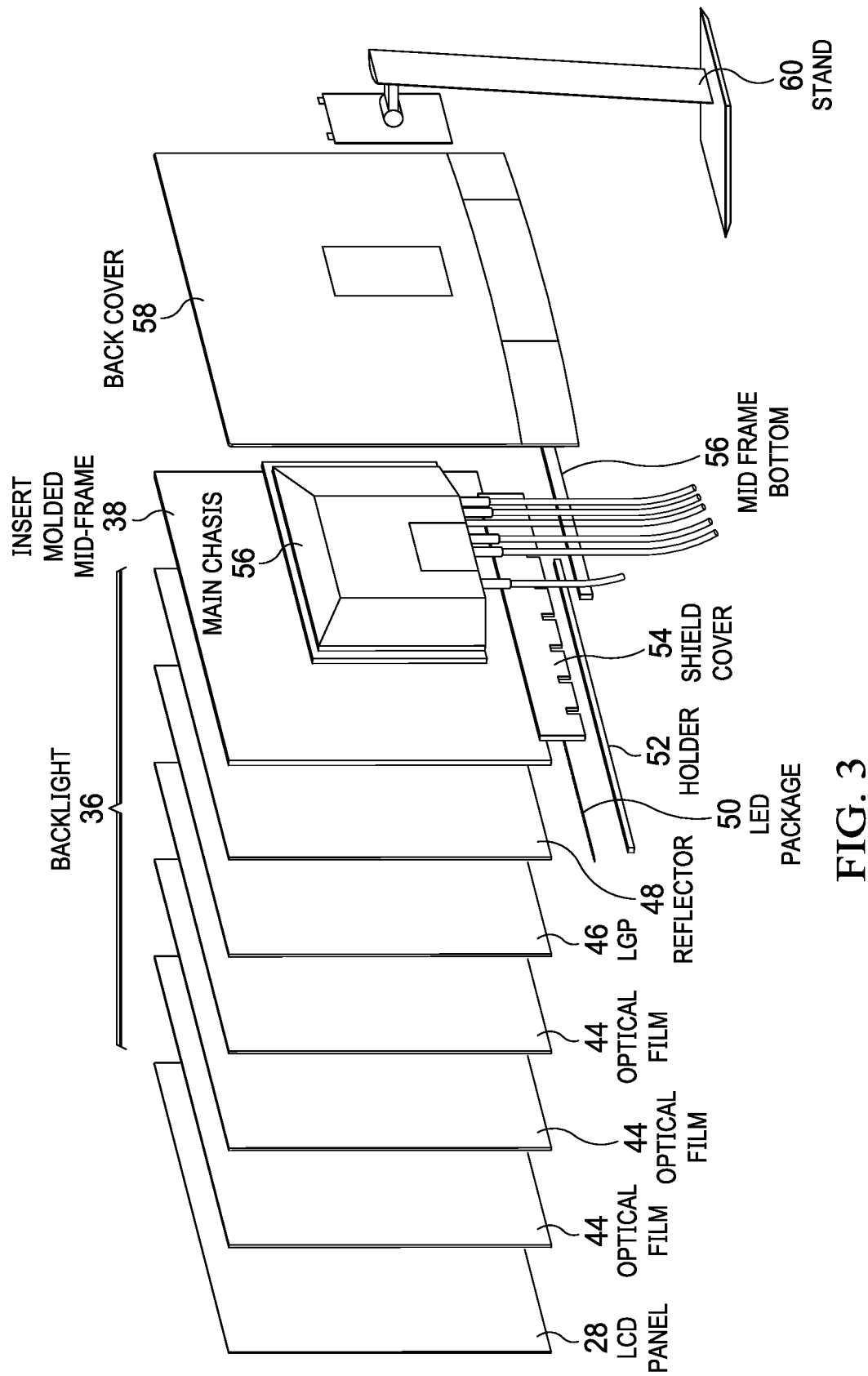
FIG. 3 depicts a rear exploded view depicts the peripheral display.

Referring now to FIG. 3, a rear exploded view depicts the peripheral display 12. The rear exploded view illustrates display element stack up as supported by insert molded mid-frame structure 38. In the example embodiment, mid-frame structure 38 holds LCD panel 28 and backlight 36 in alignment at a front side and also provides coupling structures for a main chassis 56 and back cover 58 at a rear side. Main chassis 56 includes processing components that cooperate to manager presentation of visual images at display 12, such as a timing controller, power supply, scalar and other conventional display components. Main chassis 56 accepts a back cover 58 that includes a VESA standard or other type of stand connector for coupling with display stand 60. By coupling to insert molded attachment points of mid-frame structure 38, a reduced thickness for display 12 from front to rear is achieved.

In the example embodiment, LED package 50 includes plural evenly spaced LEDs that provide a uniformly-distributed light source into the bottom side of light guide plate 46. An elongated holding member 52 fits under LED package 50 to hold the evenly spaced LEDs integrated in LED package 50 in close proximity to light guide plate 46. By providing as uniform of a light source as possible into light guide plate 46, LED package minimizes post illumination management need to smooth the light that proceeds through LCD panel 38. One factor for improving light illumination uniformity is having an even distribution of LEDs in close proximity to each other and with an even spacing to light guide plate 46. To achieve this even spacing, elongated holding member 52 holds LED package 50 in place by coupling to mid-frame structure 38 only at opposing ends of light guide plate 46, which sets a consistent distance between LEDs and light guide plate 48 along its length without any intervening structures. That is, along the entire length of LED package 50 no structures are included between LEDs that touch light guide plate 46 or otherwise space LED package 50 from light guide plate 46.

Figure 4B:
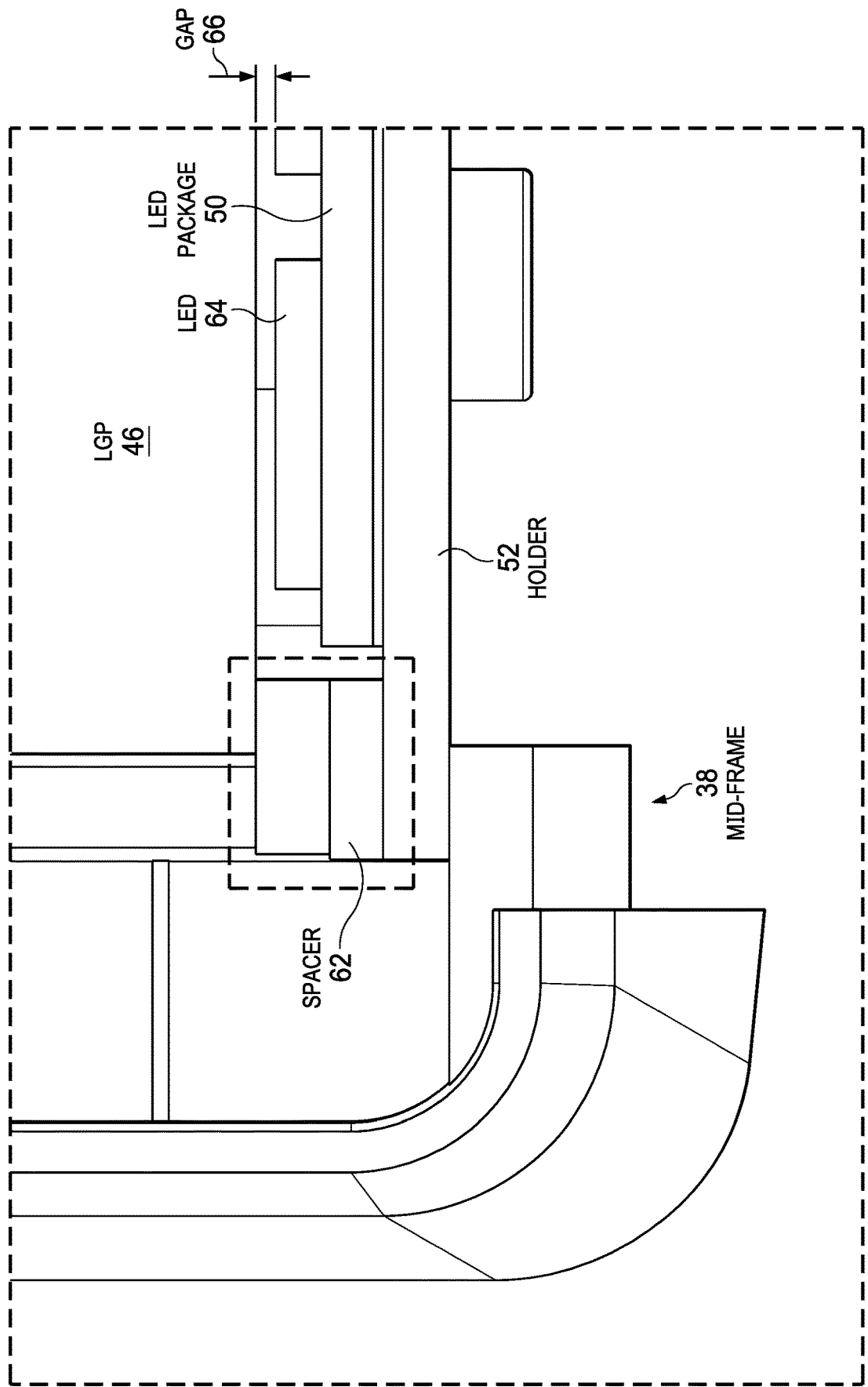
Figure 4C:
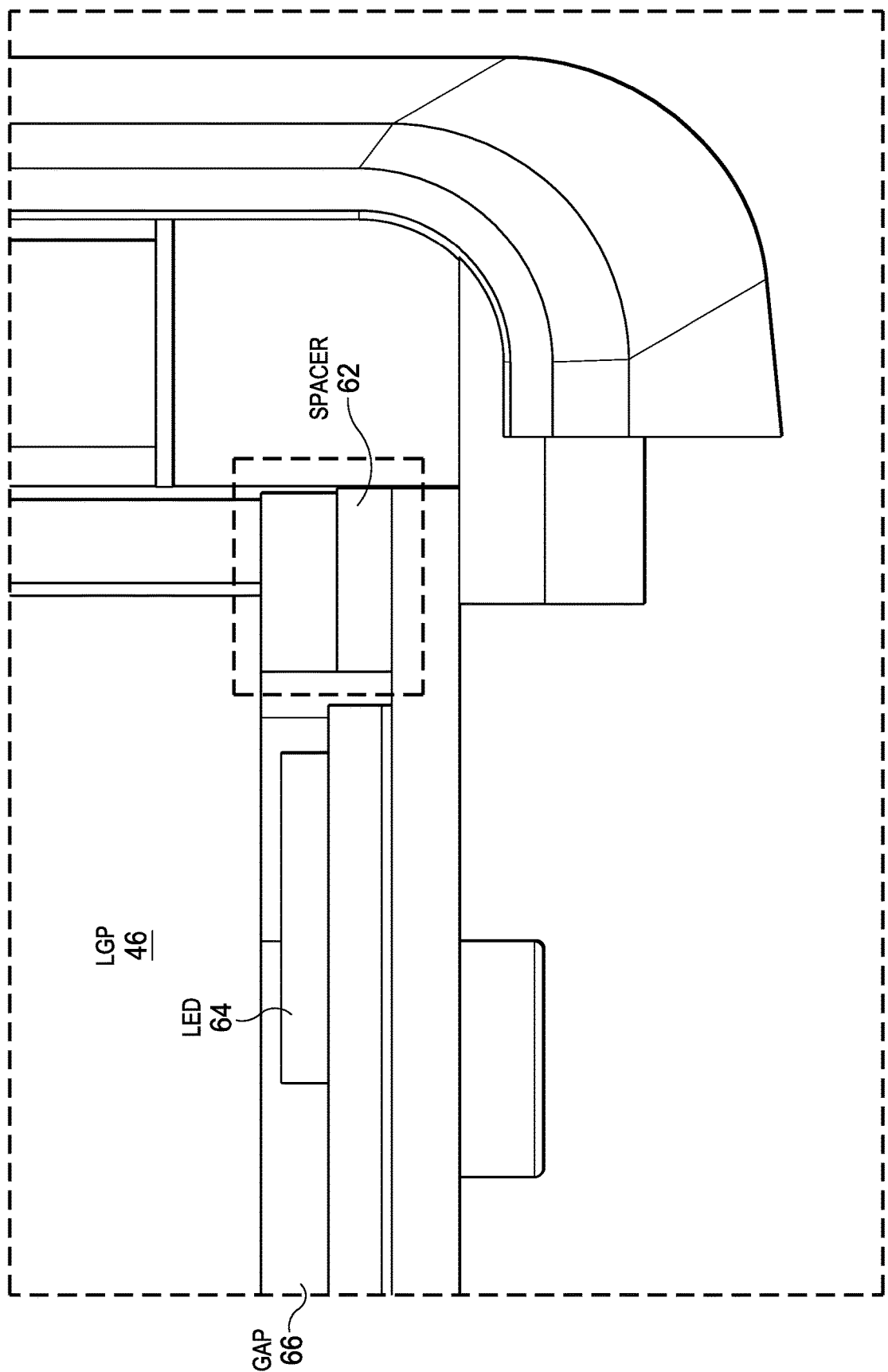

Referring now to FIGS. 4A-C, a front view depicts peripheral display 12 light guide plate 46 having a light emitting diode package 50 held in a spaced relationship. Mid-frame structure 38 integrates a spacer 62 at opposing ends of the bottom side of light guide plate 46 upon which light guide plate 46 rests. For instance, spacers 62 are integrated in mid-frame structure 38 as part of an injection molding manufacture of mid-frame structure 38. In the example embodiment, spacers 62 have a height that is slightly greater than the height of LED package 50 so that a gap 62 is provided between the top of each LED 64 and the bottom of light guide plate 46. Elongated holding member 52 supports LED package 50 by inserting in an opening formed under each spacer 62 on opposing ends of mid-frame structure 38.

In the example embodiment, gap 66 is maintained as a consistent distance along the entire bottom length of light guide plate 46 without any additional spacing structures extending up from LED package 50. The consistent gap 66 provides a uniform light transmission from LED package 50 to light guide plate 46. In addition, gap 66 provides adequate spacing so that heat from LEDs 64 do not damage material of light guide plate 46. For example, plastic-based light guide plates have excellent light transmission characteristics and light weight when compared to glass plates, however, plastic material tends to have greater sensitivity to heat that LEDs 64 release. Some example embodiments have light guide plates 46 made of poly(methyl methacrylate) ("PMMA"), methylmethacrylate ("MA"), and methyl methacrylate-co-styrene ("MS"). Gap 66 provides adequate spacing so that thermal energy released by LEDs 64 do not damage the plastic material.

Although the present invention has been described in detail, it should be understood that various changes, substitutions and alterations can be made hereto without departing from the spirit and scope of the invention as defined by the appended claims.

What is claimed is:

1. An information handling system peripheral display comprising:
 a liquid crystal display panel having plural pixels of liquid crystal, the liquid crystal selectively passing and filtering light from a rear surface to a front surface based upon a crystal state, the plural pixels generating an image;
 a controller interfaced with the plural pixels, the controller setting the crystal state of the plural pixels to define the image;
 a light guide plate disposed behind the liquid crystal display panel rear surface and operable to distribute light across the liquid crystal display panel;
 a light emitting diode (LED) package having plural LEDs in a linear configuration; and
 a frame sized to contain the liquid crystal display panel and light guide plate, the frame integrating first and second spacers formed at opposing ends of one side of the light guide plate, the LED package coupled to the frame between the first and second spacers, the first and second spacers engaged against the light guide plate to maintain a predetermined spacing between the LED package and light guide plate.

2. The information handling system peripheral display of claim 1 further comprising:
 a reflector plate disposed at a rear surface of the light guide plate to reflect light towards the liquid crystal display panel; and
 a diffuser plate disposed between the light guide plate and the liquid crystal display panel to diffuse light provided from the light guide plate across the liquid crystal display.

3. The information handling system peripheral display of claim 1 wherein the LED package comprises plural LEDs disposed in the linear configuration with even spacing between the LEDs along all of the length of the LED package.

4. The information handling system peripheral display of claim 1 wherein the light guide plate is plastic material.

5. The information handling system peripheral display of claim 4 wherein the plastic is poly(methyl methacrylate) ("PMMA").

6. The information handling system peripheral display of claim 4 wherein the plastic is methylmethacrylate ("MA").

7. The information handling system peripheral display of claim 1 wherein the first and second spacers are formed at opposing ends of the bottom side of the frame, the light guide plate resting on the first and second spacers.

8. The information handling system peripheral display of claim 7 wherein the first and second spacers are injection molded to integrated with the frame.

9. The information handling system peripheral display of claim 8 wherein the frame between the spacers lacks any structure that engages upward against the light guide plate.

10. A method for presenting visual images at a display, the method comprising:
  disposing a light guide plate behind a liquid crystal display panel;
  aligning a light emitting diode package along one side of the light guide plate to provide illumination through the light guide plate as a backlight to the liquid crystal display panel; and
  coupling the liquid crystal display panel, the light guide plate and the light emitting diode package to a midframe structure, the mid-frame structure integrating first and second spacers at opposing sides of the light guide plate, the first and second spacers engaging the light guide plate to maintain a spaced relationship between the light guide plate and light emitting diode package.

11. The method of claim 10 further comprising:
  evenly spacing plural light emitting diodes along a length of the light emitting diode package;
  wherein each light emitting diode has the spaced relationship from the light guide plate.

12. The method of claim 11 further comprising maintaining the spaced relationship between the light emitting diodes and light guide plate with only the first and second spacers located at opposing ends of the light emitting diode package.

13. The method of claim 12 wherein the light guide plate is poly(methyl methacrylate) ("PMMA") plastic.

14. The method of claim 12 wherein the light guide plate is methylmethacrylate ("MA") plastic.

15. The method of claim 10 further comprising:
  injection molding the midframe structure to integrate the first and second spacers; and
  coupling the light emitting diode package to the midframe structure with a member that supports the light emitting diode package between the opposing sides of the light guide plate.

16. A display comprising:
  a liquid crystal display panel;
  a backlight structure including at least a light guide plate aligned to provide illumination at a back side of the liquid crystal display panel to present visual images at a front side of the liquid crystal display panel;
  a midframe structure configured to accept the backlight structure, the midframe structure integrating first and second spacers at opposing ends of a bottom side of the light guide plate, the light guide resting on the first and second spacers; and
  a light emitting diode package disposed along the bottom side of the light guide plate in a spaced relationship defined by the first and second spacers.

17. The display of claim 16 further comprising:
  a supporting member disposed under the light emitting diode package to hold the light emitting diode package in the spaced relationship;
  wherein the supporting member engages the first and second spacers to define the spaced relationship.

18. The display of claim 17 wherein the light emitting diode package comprises evenly spaced light emitting diodes disposed along the entire length of the bottom side of the light guide plate.

19. The display of claim 18 wherein no physical structure touches the bottom side of the light guide plate between first and second spacers.

20. The display of claim 19 wherein the light guide plate is methyl methacrylate-co-styrene ("MS").

* * * * *